(12) United States Patent
Christenson et al.

(10) Patent No.: US 7,719,976 B2
(45) Date of Patent: May 18, 2010

(54) VARIABLE DYNAMIC THROTTLING OF NETWORK TRAFFIC FOR INTRUSION PREVENTION

(75) Inventors: David A. Christenson, Fergus Falls, MN (US); James R. Coon, Rochester, MN (US); Christopher T. Gloe, Rochester, MN (US); Daniel P. Kolz, Rochester, MN (US); Scott D. McCreadie, Rochester, MN (US); Timothy R. Seeger, Rochester, MN (US); Kyong J. Shim, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 11/752,972

(22) Filed: May 24, 2007

(65) Prior Publication Data

US 2008/0291934 A1    Nov. 27, 2008

(51) Int. Cl.
   - *H04L 12/56* (2006.01)
   - *H04L 12/403* (2006.01)
   - *G06F 11/00* (2006.01)

(52) U.S. Cl. .................. 370/230; 370/252; 714/22
(58) Field of Classification Search ............. 370/230, 370/230.1, 231, 252; 726/22, 23
See application file for complete search history.

(56) References Cited

U.S. PATENT DOCUMENTS 7,099,320 B1 * 8/2006 Salerno ............. 370/389
7,436,770 B2 * 10/2008 Sterne et al. ............. 370/235
2004/0193726 A1 * 9/2004 Gatto et al. ............. 709/238
2005/0195840 A1 * 9/2005 Krapp et al. ............. 370/401
2007/0280114 A1 * 12/2007 Chao et al. ............. 370/235.1
2008/0052628 A1 * 2/2008 Bugenhagen et al. ....... 715/736
2008/0240128 A1 * 10/2008 Elrod ................. 370/401

OTHER PUBLICATIONS

"Dynamic Bandwidth Throttling," iAnywhere Solutions, Inc., www.iAnywhere.com, May 17, 2005, pp. 1-17.

* cited by examiner

Primary Examiner—Chi H Pham
Assistant Examiner—Ahmed Elallam
(74) Attorney, Agent, or Firm—Biggers & Ohanian, LLP; James R. Nock

(57) ABSTRACT

Methods, apparatus, and computer program products for variable dynamic throttling of network traffic for intrusion prevention are disclosed that include initializing, as throttling parameters, a predefined time interval, a packet count, a packet count threshold, a throttle rate, a keepers count, and a discards count; starting a timer, the timer remaining on no longer than the predefined time interval; maintaining, while the timer is on, statistics including the packet count, the keepers count, and the discards count; for each data communications packet received by the network host, determining, in dependence upon the statistics and the throttle rate, whether to discard the packet and determining whether the packet count exceeds the packet count threshold; and if the packet count exceeds the packet count threshold: resetting the statistics, incrementing the throttle rate, and restarting the timer.

12 Claims, 9 Drawing Sheets

VARIABLE DYNAMIC THROTTLING OF NETWORK TRAFFIC FOR INTRUSION PREVENTION

BACKGROUND OF THE INVENTION

1. Field of the Invention

The field of the invention is data processing, or, more specifically, methods, apparatus, and products for variable dynamic throttling of network traffic for intrusion prevention.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas in which progress has been made is in variable dynamic throttling of network traffic for intrusion prevention. Data communications networks are bombarded with suspicious network traffic. Some of the traffic can be the malicious, denial-of-service variety, such as, for example, flood or echo requests to broadcast or multicast addresses. Some of the traffic may be slow and stealthy, such as port scanning, for example, designed by a potential intruder to learn more about the network host with each probe.

In the current art, firewalls are used to filter out unfamiliar IP addresses, and for those intrusions that make it through a firewall, IP address filters can be used on a network host to permit or deny data communications packets. In addition to IP filtering, Quality of Service ('QoS') policies can be created to control network congestion by specifying connection rates and burst limits. When IP filters or QoS policies are engaged, it takes intervention by a system administrator to disengage them.

Also in the current art, intrusion detection systems ('IDS'), potential intruders, and network flows are typically completely denied or blocked. It is often impossible to distinguish between a good client generating an unusually high volume of network traffic and an intruder trying to disrupt or compromise a network host. As a result, a good client can get classified as an intruder and consequently be denied access to the network host.

SUMMARY OF THE INVENTION

Methods, apparatus, and computer program products for variable dynamic throttling of network traffic for intrusion prevention are disclosed that include a throttle module's initializing, as throttling parameters, a predefined time interval, a packet count, a packet count threshold, a throttle rate, a keepers count, and a discards count; starting a timer, the timer remaining on no longer than the predefined time interval; maintaining, while the timer is on, statistics including the packet count, the keepers count, and the discards count; for each data communications packet received by the network host, determining, in dependence upon the statistics and the throttle rate, whether to discard the packet and determining whether the packet count exceeds the packet count threshold; and if the packet count exceeds the packet count threshold: resetting the statistics, incrementing the throttle rate, and restarting the timer. The throttle module is installed in a network host. The network host includes a computer that receives data communications packets from the network.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
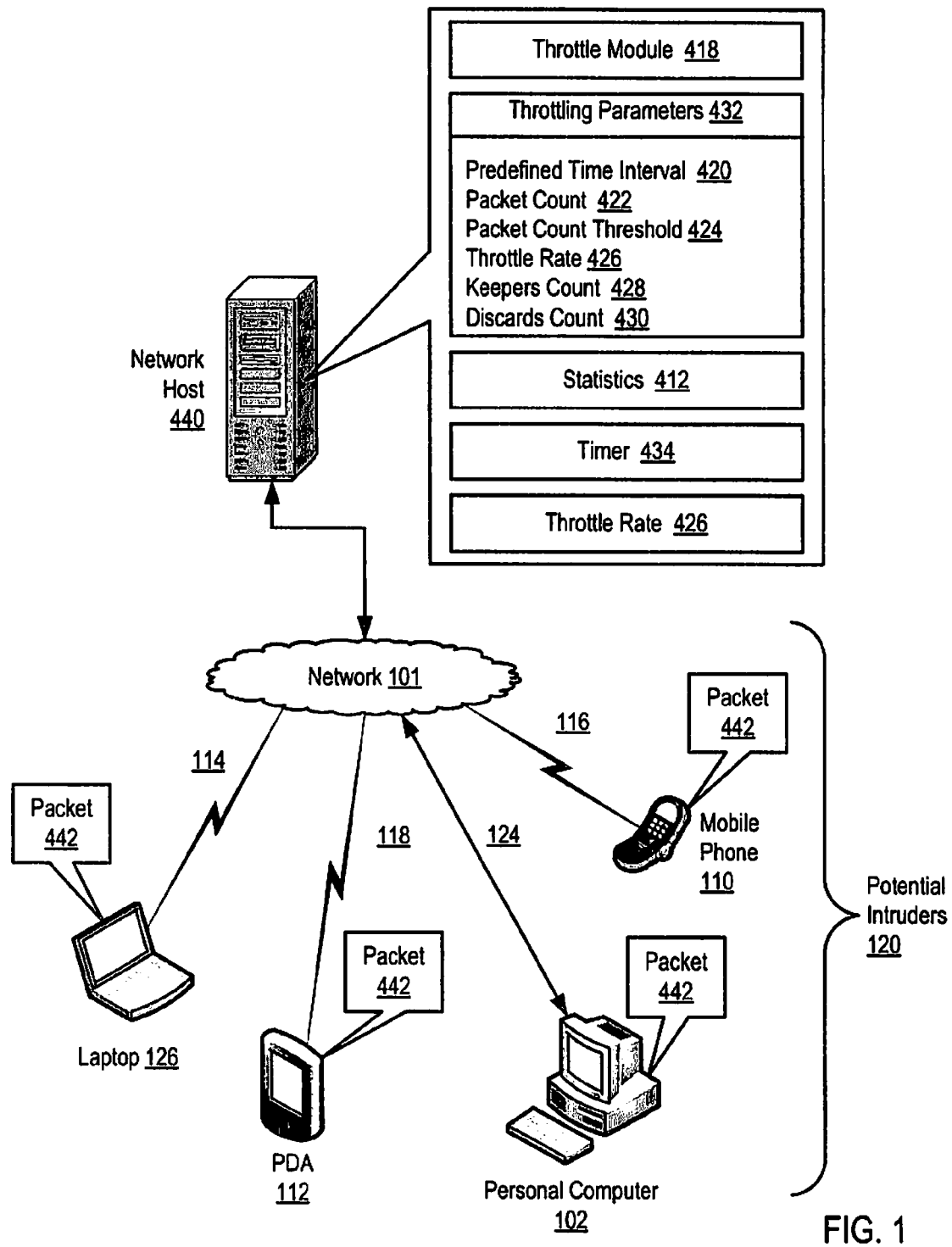
FIG. 1 sets forth a network diagram of a system for variable dynamic throttling of network traffic for intrusion prevention according to embodiments of the present invention.

Exemplary methods, apparatus, and products for variable dynamic throttling of network traffic for intrusion prevention in accordance with the present invention are described with reference to the accompanying drawings, beginning with FIG. 1. FIG. 1 sets forth a network diagram of a system for variable dynamic throttling of network traffic for intrusion prevention according to embodiments of the present invention. Throttling is a method of limiting the quantity of data communications packets that are received by a network host during a predefined period of time. A data communications packet (442) is a formatted block of information transmitted through a network (101). A packet may be transmitted through a network in accordance with a number of communications protocols such as, for example, the Transmission Control Protocol ('TCP'), the User Datagram Protocol ('UDP'), the Datagram Congestion Control Protocol ('DCCP'), the Reliable User Datagram Protocol ('RUDP') and so on.

A potential intruder (120) sends data communications packets (422) through the network (101) to a network host (440). The potential intruders (120) are characterized as 'potential' because it is possible that some non-malicious data communications packets are incorrectly indicative of suspicious activity. That is, legitimate, non-malicious data packets may appear to a network host (440) as malicious data packets. The system of FIG. 1 includes four potential intruders (120) that are the originators of the data communications packets (442) received by the network host (440):

laptop computer (126), which is coupled for data communications to data communications network (101) through wireless connection (114), personal digital assistant ('PDA') (112), which is coupled for data communications to data communications network (101) through wireless connection (118), personal computer (102), which is coupled for data communications to data communications network (101) through wireline connection (124), and mobile telephone (110), which is coupled for data communications to data communications network (442) through wireless connection (116).

The system of FIG. 1 also includes a network host (440) that receives data communications packets (442) from a network (101). A network host (440) is any automated computing machinery, such as a server or personal computer, that is capable of receiving data communications packets (442) through a data communications network (101). The exemplary network host (440) of FIG. 1 includes a throttle module (418). The throttle module is a module of computer program instructions that provides variable dynamic throttling of network traffic for intrusion prevention according to embodiments of the present invention by initializing, as throttling parameters (432), a predefined time interval (420), a packet count (422), a packet count threshold (424), a throttle rate (426), a keepers count (428), and a discards count (430). A packet count (422) is the number of packets received by the network host (440) during the predefined period of time (420). A packet count threshold (424) is the maximum number of packets that the network host (440) can receive during the predefined period of time without incrementing the throttle rate (426). The throttle rate (426) is the percentage of data communications packets (442) the throttle module (418) will typically discard within the predefined period of time. If the throttle rate is 80%, for example, four out of every five packets will be discarded during the predefine time interval. The discards count (430) is the number of packets discarded, in accordance with the throttle rate, during the predefined interval of time (420). The keepers count (428) is the number of packets kept, in accordance with the throttle rate, during the predefined interval of time (420).

In the exemplary system of FIG. 1, the throttle module also starts a timer (434), the timer (434) remaining on no longer than the predefined time interval (420). The throttle module also maintains, while the timer (434) is on, statistics (412) including the packet count (422), the keepers count (430), and the discards count (430). For each data communications packet (442) received by the network host (440), the throttle module (418) determines, in dependence upon the statistics (412) and the throttle rate (426), whether to discard the packet (442) and the throttle module determines whether the packet count (422) exceeds the packet count threshold (424). If the packet count exceeds the packet count threshold, the throttle module (418) resets the statistics (412), increments the throttle rate (426), and restarts the timer (434).

The arrangement of the network host and other devices making up the exemplary system illustrated in FIG. 1 is for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Variable dynamic throttling of network traffic for intrusion prevention in accordance with the present invention is generally implemented with computers, that is, with automated computing machinery. In the system of FIG. 1, for example, all the network hosts and possible intruders are implemented to some extent at least as computers. For further explanation, therefore, FIG. 2 sets forth a block diagram of automated computing machinery comprising an exemplary network host (440) useful in variable dynamic throttling of network traffic for intrusion prevention according to embodiments of the present invention. The network host (440) of FIG. 2 includes at least one computer processor (156) or 'CPU' as well as random access memory (168) ('RAM') which is connected through a system bus (160) to processor (156) and to other components of the network host.

Stored in RAM (168) is a throttle module (404), a module of computer program instructions for variable dynamic throttling of network traffic for intrusion prevention according to embodiments of the present invention that initialize, as throttling parameters (432), a predefined time interval (420), a packet count (422), a packet count threshold (424), a throttle rate (426), a keepers count (428), and a discards count (430). The throttle module (404) also starts a timer (434). The timer (434) remains on no longer than the predefined time interval (420). The throttle module also maintains, while the timer (434) is on, statistics (412) including the packet count (422), the keepers count (430), and the discards count (430). For each data communications packet (442) received by the network host (440), the throttle module (418) also determines, in dependence upon the statistics (412) and the throttle rate (426), whether to discard the packet (442) and the throttle module (418) determines whether the packet count (422) exceeds the packet count threshold (424). If the packet count exceeds the packet count threshold, the throttle module (418) resets the statistics (412), increments the throttle rate, and restarts the timer (434).

Also stored in RAM (168) is an operating system (154). Operating systems useful in network hosts according to embodiments of the present invention include UNIX™, Linux™, Microsoft Vista™, Microsoft XP™, AIX™, IBM's i5/OS™, and others as will occur to those of skill in the art. Operating system (154), throttle module (418), throttling parameters (432), statistics (412), timer (434), and data communications packet (442) in the example of FIG. 2 are shown in RAM (168), but many components of such software typically are stored in non-volatile memory also, for example, on a disk drive (170).

Figure 2:
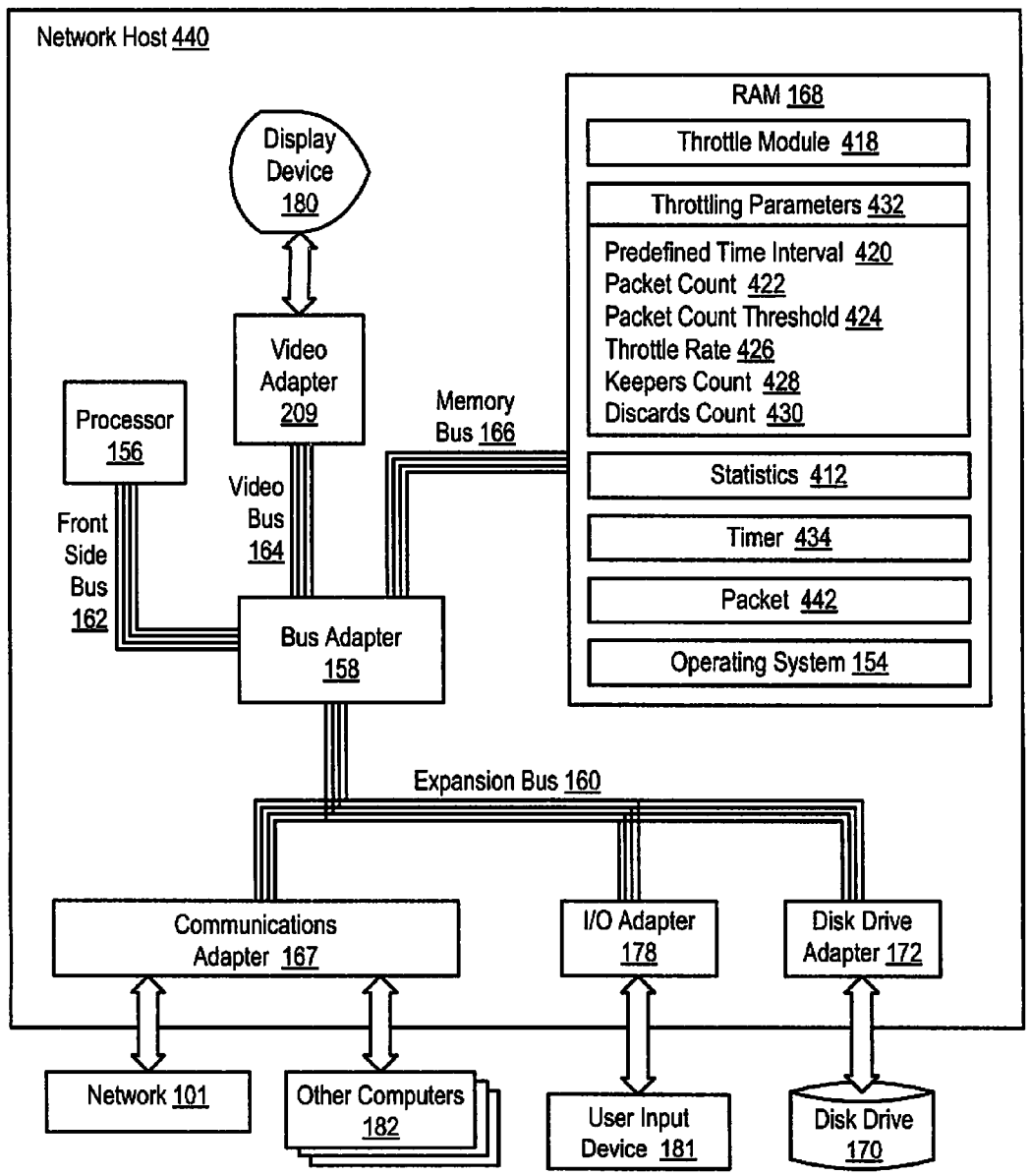
FIG. 2 sets forth a block diagram of automated computing machinery comprising an exemplary network host useful in variable dynamic throttling of network traffic for intrusion prevention according to embodiments of the present invention.

The network host (440) of FIG. 2 includes a bus adapter (158), a computer hardware component that contains drive electronics for the high speed buses, the front side bus (162), the video bus (164), and the memory bus (166), as well as drive electronics for the slower expansion bus (160). Examples of bus adapters useful for variable dynamic throttling of network traffic for intrusion prevention according to embodiments of the present invention include the Intel Northbridge, the Intel Memory Controller Hub, the Intel Southbridge, and the Intel I/O Controller Hub. Examples of expansion buses useful for variable dynamic throttling of network traffic for intrusion prevention according to embodiments of the present invention include Industry Standard Architecture ('ISA') buses and Peripheral Component Interconnect ('PCI') buses.

The network host (440) of FIG. 2 includes disk drive adapter (172) coupled through expansion bus (160) and bus adapter (158) to processor (156) and other components of the network host (440). Disk drive adapter (172) connects non-volatile data storage to the network host (440) in the form of disk drive (170). Disk drive adapters useful in network hosts include Integrated Drive Electronics ('IDE') adapters, Small Computer System Interface ('SCSI') adapters, and others as will occur to those of skill in the art. In addition, non-volatile computer memory may be implemented for a network host as an optical disk drive, electrically erasable programmable read-only memory (so-called 'EEPROM' or 'Flash' memory), RAM drives, and so on, as will occur to those of skill in the art.

The example network host (440) of FIG. 2 includes one or more input/output ('I/O') adapters (178). I/O adapters in network hosts implement user-oriented input/output through, for example, software drivers and computer hardware for controlling output to display devices such as computer display screens, as well as user input from user input devices (181) such as keyboards and mice. The example network host (440) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary network host (440) of FIG. 2 includes a communications adapter (167) for data communications with other computers (182) and for data communications with a data communications network (101). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for variable dynamic throttling of network traffic for intrusion prevention according to embodiments of the present invention include modems for wired dial-up communications, Ethernet (IEEE 802.3) adapters for wired data communications network communications, and 802.11 adapters for wireless data communications network communications.

Figure 3:
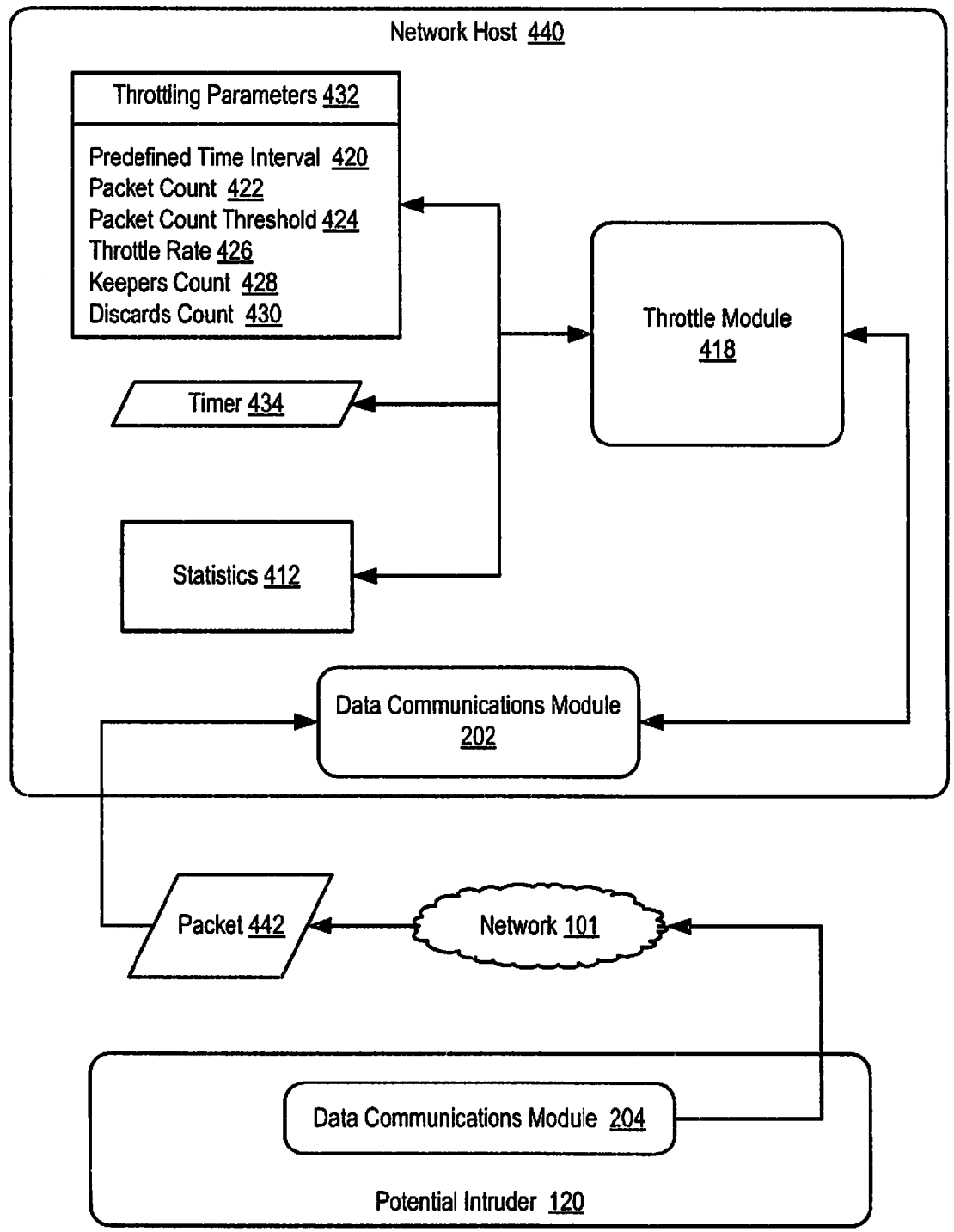
FIG. 3 sets forth a block diagram of an exemplary system for variable dynamic throttling of network traffic for intrusion prevention according to embodiments of the present invention.

For further explanation, FIG. 3 sets forth a block diagram of an exemplary system for variable dynamic throttling of network traffic for intrusion prevention according to embodiments of the present invention. The system of FIG. 3 includes a potential intruder (120). The potential intruder (120) includes a data communications module (204). The data communications module (204) is a module of computer program instructions for sending to the network host (440), through the data communications network (101), data communications packets (442).

The system of FIG. 1 also includes a network host having installed upon it a data communications module (202). The data communications module (202) is a module of computer program instructions for receiving data communications packets from the network (101). In addition to the data communications module (202), the network host also has installed upon it a throttle module (418) for variable dynamic throttling of network traffic for intrusion prevention. The throttle module (418) is implemented as computer program instructions that initialize, as throttling parameters (432), a predefined time interval (420), a packet count (422), a packet count threshold (424), a throttle rate (426), a keepers count (428), and a discards count (430). The throttle module (404) also starts a timer (434). The timer (434) remains on no longer than the predefined time interval (420). The throttle module also maintains, while the timer (434) is on, statistics (412) including the packet count (422), the keepers count (430), and the discards count (430). For each data communications packet (442) received by the network host (440), the throttle module (418) also determines, in dependence upon the statistics (412) and the throttle rate (426), whether to discard the packet (442) and the throttle module (418) determines whether the packet count (422) exceeds the packet count threshold (424). If the packet count exceeds the packet count threshold, the throttle module (418) resets the statistics (412), increments the throttle rate, and restarts the timer (434).

Figure 4:
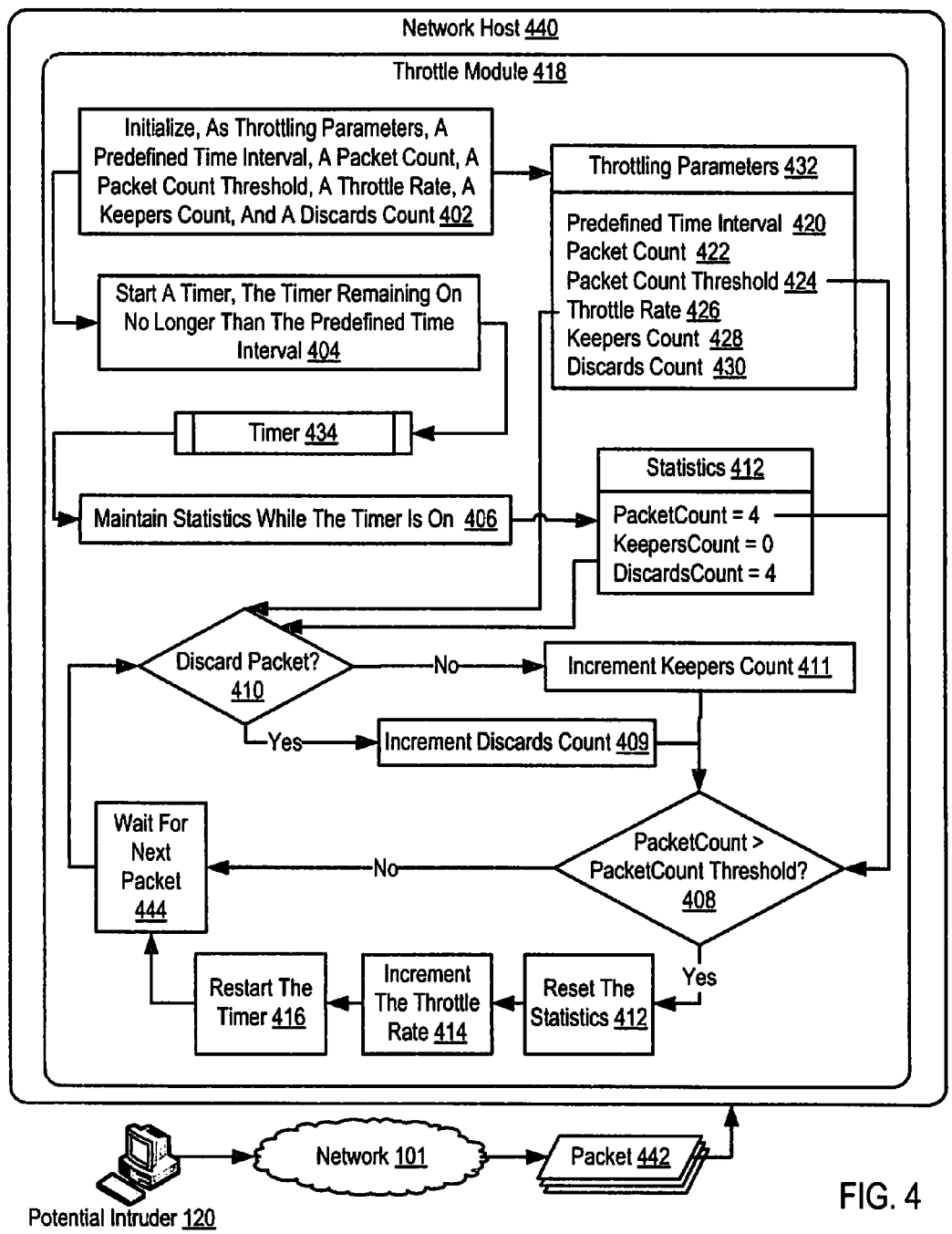
FIG. 4 sets forth a flow chart illustrating an exemplary method for variable dynamic throttling of network traffic for intrusion prevention according to embodiments of the present invention.

For further explanation, FIG. 4 sets forth a flow chart illustrating an exemplary method for variable dynamic throttling of network traffic for intrusion prevention according to embodiments of the present invention. The exemplary method of FIG. 4 is implemented by a throttle module (418) that is installed in a network host. The network host (440) includes a computer that receives data communications packets (442) from the network (101). A data communications packet (442) is a formatted block of information transmitted through a data communications network. A packet may be transmitted through a network in accordance with a number of communications protocols such as, for example, the Transmission Control Protocol ('TCP'), the User Datagram Protocol ('UDP'), the Datagram Congestion Control Protocol ('DCCP'), the Reliable User Datagram Protocol ('RUDP') and so on. Data communications packets (422) may be sent through the network (101) to a network host (440) by a potential intruder (120). The potential intruder (120) is characterized as 'potential' because it is possible that some non-malicious data communications packets are incorrectly indicative of suspicious activity. That is, legitimate, non-malicious data packets may appear to a network host (440) as malicious data packets.

The method of FIG. 4 includes initializing (402), by the throttle module (418), as throttling parameters (432), a predefined time interval (420), a packet count (422), a packet count threshold (424), a throttle rate (426), a keepers count (428), and a discards count (430). A packet count (422) is the number of packets received by the network host during a timer. A packet count threshold (424) is the maximum number of packets that a network host can receive during a timer without incrementing the throttle rate. The throttle rate (426) is the percentage of packets to discard during the predefined interval of time (420). The discards count (430) is the number of packets discarded, in accordance with the throttle rate, during the predefined interval of time (420). The keepers count (428) is the number of packets kept, in accordance with the throttle rate, during the predefined interval of time (420).

The throttle module (418) may initialize (402) the throttling parameters (432) by setting each parameter to an initial default value.

The method of FIG. 4 also includes starting (404) a timer (434), the timer (434) remaining on no longer than the predefined time interval (420). The exemplary timer (434) of FIG. 4 is a predefined process that counts up to the predefined time interval (420) or, alternatively, counts down from the predefined time interval (420). If the predefined time interval (420) is 3 minutes, for example, the timer may count down from 3 minutes or count up to 3 minutes. The throttle module (418) may start (404) the timer (434) by sending an instruction to the timer to initiate the predefined process of counting up or counting down. The instruction to initiate the predefined process may include the predefined time interval (420).

The method of FIG. 4 also includes maintaining (406), while the timer (434) is on, statistics (412) including the packet count (422), the keepers count (430), and the discards count (430). The statistics (412) in FIG. 4 are implemented as a data structure that includes the current value during the timer of the packet count (422), the keepers count (430), and the discards count (430). The throttle module (418) maintains (406) statistics (412) for each data communications packet (442) received by the network host (440) by incrementing (524) the packet count (422), incrementing (409) the discards count (430) if determining (410) whether to discard the packet (442) results in a determination to discard the packet, and incrementing (411) the keepers count (428) if determining (410) whether to discard the packet (442) results in a determination not to discard the packet. That is, for each data communications packet (442) received by the network host (440) the throttle module (418) increases, by one, the packet count (422). For each packet that is not discarded during the timer, the throttle module (418) increases, by one, the keepers count (428).

And for each data communications packet (442) received by the network host (440) that is discarded, the throttle module (418) increases, by one, the discards count (430). In example of FIG. 4, the statistics include a packet count of four, a keepers count of zero, and a discards count of four. These values are representative of a throttle rate of 100%, or a throttle rate of 80%, where only four packets have been received by the network host and the throttle module has discarded all four.

The method of FIG. 4 also includes determining (410), in dependence upon the statistics (412) and the throttle rate (426), for each data communications packet (442) received by the network host (440), whether to discard the packet (442). Determining (410) whether to discard the packet (442) is carried out by expressing (446) the throttle rate (426) as an irreducible fraction having a numerator and a denominator, discarding (450) the packet and incrementing (452) the discards count (430) if the discards count (430) is less than the numerator, and keeping (456) the packet and incrementing (458) the keepers count if the discards count (430) is equal to the numerator as explained in greater detail with respect to FIG. 5. If determining (410) whether to discard the packet (442) results in a determination to discard the packet (442), the throttle module (418) increments (409) the discards count (430). If, however, determining (410) whether to discard the packet (442) results in a determination not to discard the packet (442), the throttle module (418) increments (411) the keepers count (428).

The method of FIG. 4 also includes determining (408), for each data communications packet (442) received by the network host (440), whether the packet count (422) exceeds the packet count threshold (424). Determining (408) whether the packet count (422) exceeds the packet count threshold (424) is carried out by comparing the packet count (422), incremented after the network host (440) receives a packet (442), to the packet count threshold (424). Consider, for example, a packet count threshold of ten. If the network host (440) receives eleven packets (442) during the timer (434), the packet count (422) will be eleven and the packet count (422) will exceed the packet count threshold (424). Exceeding the packet count threshold (424) is an indication that the suspicious activity of the potential intruder (120) has not decreased during the predefined time interval (420).

If the packet count (422) does not exceed the packet count threshold (424) the throttle module (418) waits (444) for the network host (440) to receive the next packet (442). Alternatively, if the packet count (422) exceeds the packet count threshold (424) the throttle module (418) resets (412) the statistics (412), increments (414) the throttle rate (426), and restarts (416) the timer (434). The throttle module resets (412) the statistics (412) by setting the packet count (422), the keepers count (428), and the discards count (430) to zero. The throttle module (418) increments (414) the throttle rate (426) by increasing the throttle rate (426) by 10% if the throttle rate (426) is less than 100%. If the throttle rate is not less than 100%, the throttle module (418) sets the throttle rate (426) to 100%. The throttle module (418) restarts (416) the timer by sending an instruction to the timer to initiate a restart. When the statistics have been reset, the throttle rate has been incremented, and the timer has been restarted, the throttle module waits (444) for the network host (440) to receive the next packet (442). The actions taken by the throttle module (418) in dependence upon the determination (408) whether the packet count (422) exceeds the packet count threshold (424) are shown below in the form of C-like pseudocode:

```
DetermineThresholdViolation (PacketCount) {
    if (PacketCount > PacketCountThreshold {
        PacketCount = 0;
        DiscardsCount = 0;
        KeepersCount = 0;
        IncreaseThrottle (ThrottleRate);
        Timer (InitiateRestart);
        Wait ( );
    }
    else {
        Wait ( );
    }
}
IncreaseThrottle (ThrottleRate) {
    if (ThrottleRate < 100%) {
        ThrottleRate = ThrottleRate + 10%;
    }
    else {
        ThrottleRate = 100%;
    }
}
```

As can be seen from the pseudocode above, the threshold module determines whether the packet count exceeds the packet count threshold by calling the DetermineThresholdViolation function that compares the packet count, 'PacketCount,' to the packet count threshold, 'PacketCountThreshold.' If the packet count is greater than the packet count threshold, the packet count, the discards count, 'DiscardsCount,' and the keepers count, 'KeepersCount' are set to zero. After the packet count, discards count, and keepers count are set to zero, the throttle module increments the throttle rate by passing the IncreaseThrottle function the throttle rate. After the throttle rate is increased the throttle module restarts the timer by sending the Timer function an instruction to restart, 'InitateRestart.' After the timer is restarted, the throttle module waits for the network host to receive the next data communications packet. If the packet count is less than packet count threshold, the throttle module waits for the network host to receive the next data communications packet without taking any further action.

The IncreaseThrottle function, in the above pseudocode, includes a determination of whether the throttle rate is less than 100%. If the throttle rate is less than 100% the throttle module increases the throttle rate, 'ThrottleRate,' by 10%. If the throttle rate is not less than 100%, the throttle rate is set to 100%. Setting the throttle rate to 100% in the pseudocode is shown here for clarity. Readers will recognize that the throttle rate does not exceed 100% if the throttle rate is increased by 10% increments and the original throttle rate is an integer multiple of 10%, such as, for example, 20%, 30%, 40% and so on. Readers will also recognize that the IncreaseThrottle function may include a determination of whether the throttle rate is 100% as an alternative to the determination of whether the throttle rate is less than 100%. If the IncreaseThrottle function includes the determination of whether the throttle rate is 100%, the throttle module increases the throttle rate only when the throttle rate is not 100%.

In the method of FIG. 4, if a packet (442) is received by the network host while the throttle module is waiting (444), the throttle module (418) determines (410) whether to discard the packet (442) and determines (408) whether the packet count (408) exceeds the packet count threshold (424). That is, the throttle module (418) will throttle data communications packets (442) received by the network host (440) according to the throttle rate (426) until the packet count (422) is less than the packet count threshold (424) and the timer (434) expires.

Figure 5:
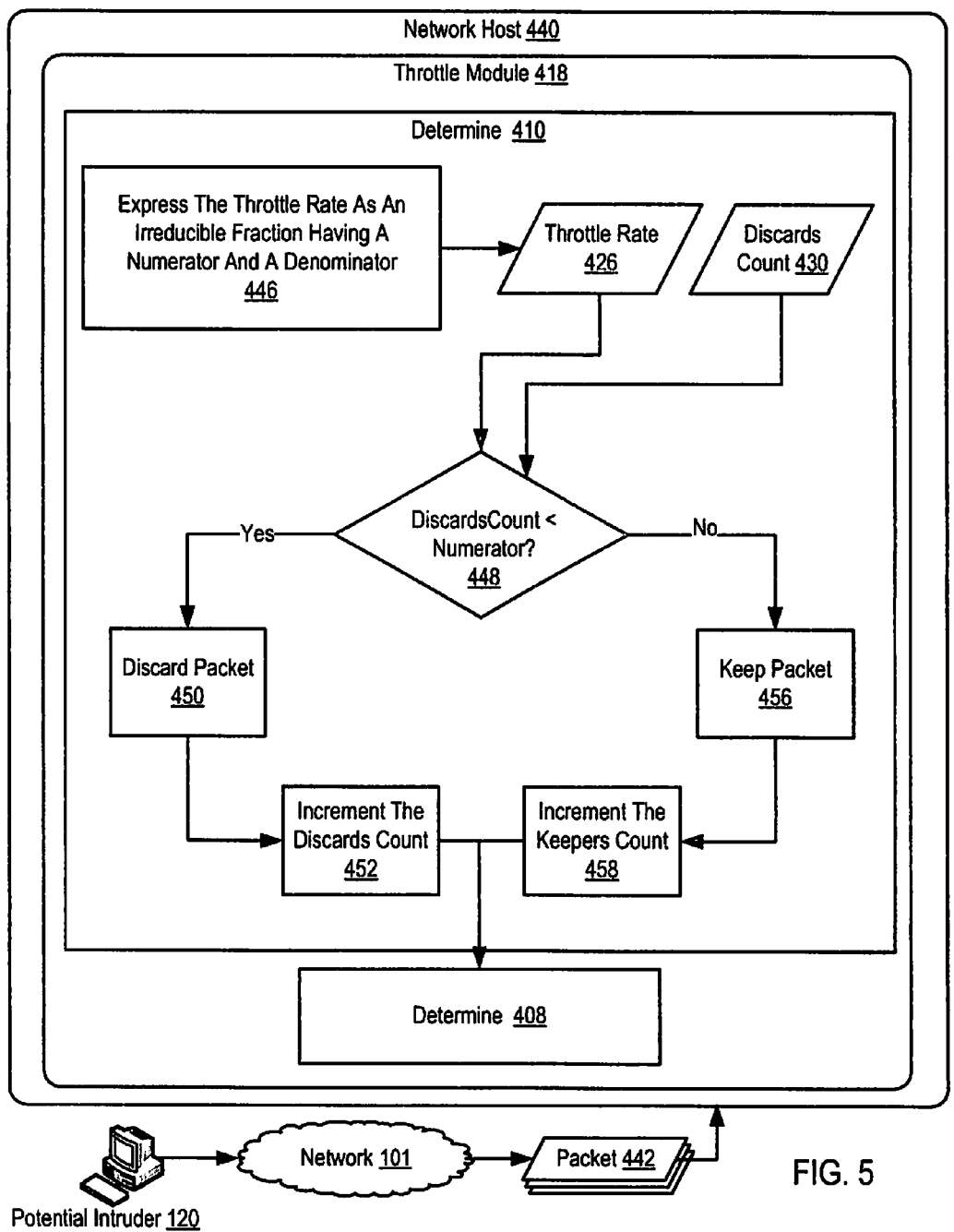
FIG. 5 sets forth a flow chart illustrating an exemplary method for determining whether to discard a packet according to embodiments of the present invention.

For further explanation, FIG. 5 sets forth a flow chart illustrating an exemplary method for determining whether to discard a packet according to embodiments of the present invention. The method of FIG. 5 is similar to the method of FIG. 4, including as it does, the throttle module's (418) determining (410) whether to discard the packet (442) and determining (408) whether the packet count (422) exceeds the packet count threshold (424), all of which operate in a similar manner as described above. In the method of FIG. 5, however, determining (410) whether to discard is carried out by expressing (446) the throttle rate (426) as an irreducible fraction having a numerator and a denominator. A fraction is irreducible if the numerator and denominator are coprime, that is, if the numerator and the denominator have a greatest common divisor of 1. For example, ⅔ is not an irreducible fraction, but ½ is an irreducible fraction. If the discards count (430) is less than the numerator, the throttle module discards (450) the packet and increments (452) the discards count (430). If the discards count is equal to the numerator, the throttle module keeps (456) the packet (442) and increments (458) the keepers count. Consider as an example of determining (410) whether to discard the packet (442), the following C-form pseudocode:

```
DiscardPacket (ThrottleRate) {
    ExpressThrottleRateFraction (ThrottleRate);
    if (DiscardsCount < ThrottleNumerator) {
        DiscardPacket( );
        DiscardsCount = DiscardsCount ++;
    }
    else {
        KeepPacket( );
        KeepersCount = KeepersCount ++;
```
```
    }
}
```

The DiscardPacket function above includes a call to another function, the ExpressThrottleRateFraction function. The throttle module (418) sends the throttle rate to the ExpressThrottleRateFraction function as a parameter. The ExpressThrottleRateFraction function returns the throttle rate expressed as an irreducible fraction having a numerator, 'ThrottleNumerator,' and denominator. The throttle module (418) uses the throttle numerator to determine whether to discard the packet by comparing the throttle numerator with the discards count, 'DiscardsCount.' If the discards count is less than the throttle numerator, the throttle module (418) discards the packet by calling the DiscardPacket function and increments the discards count by one. If the discards count is not less than the throttle numerator, the throttle module (418) keeps the packet by calling the KeepPacket function and increments the keepers count, 'KeepersCount,' by one.

Figure 6:
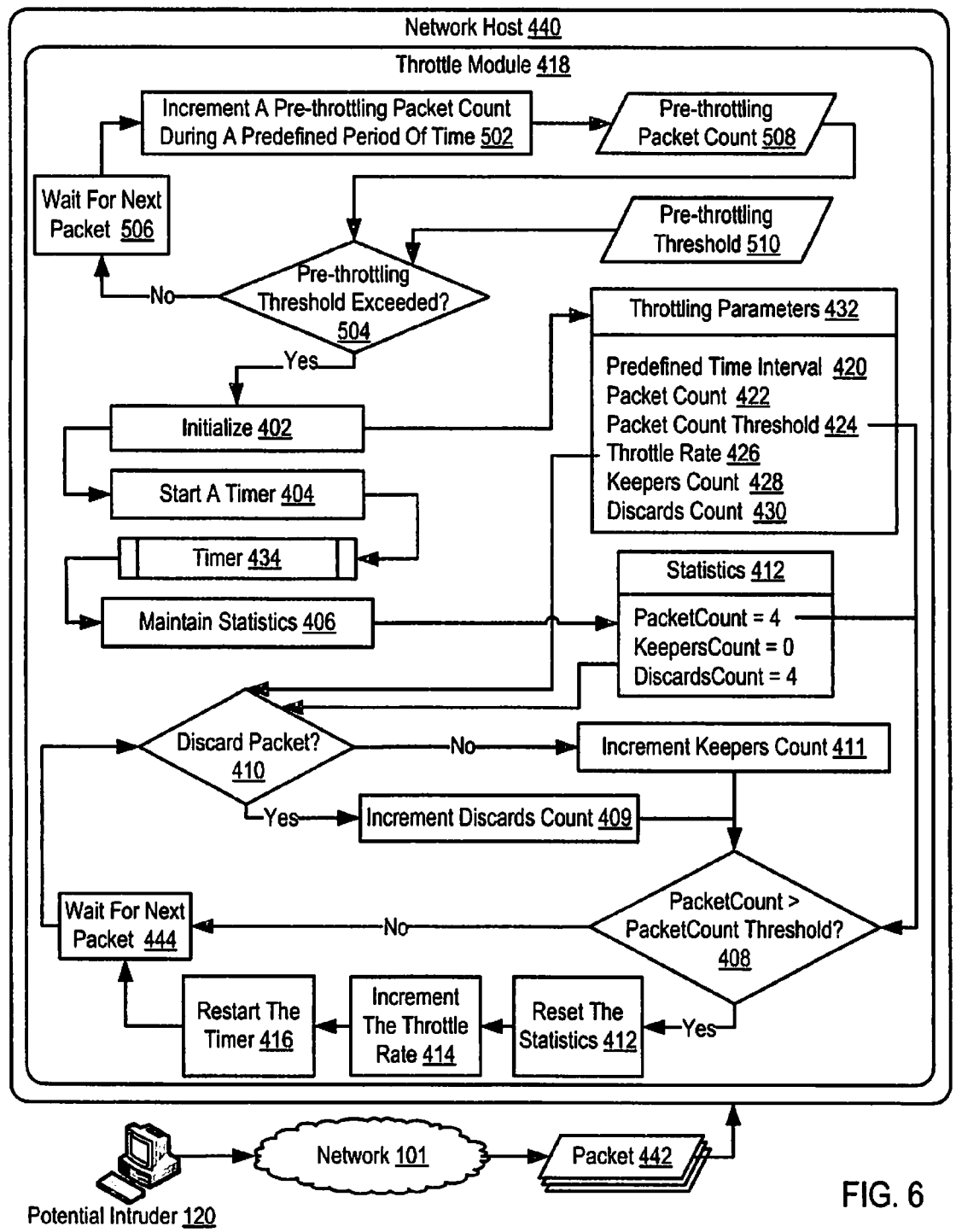
FIG. 6 sets forth a flow chart illustrating a further exemplary method for variable dynamic throttling of network traffic for intrusion prevention according to embodiments of the present invention.

For further explanation, FIG. 6 sets forth a flow chart illustrating a further exemplary method for variable dynamic throttling of network traffic for intrusion prevention according to embodiments of the present invention. The method of FIG. 6 is similar to the method of FIG. 4, including as it does the throttle module's initializing (402) the throttling parameters (432), starting (404) a timer (434), maintaining (406) statistics (412), determining (410) whether to discard the packet (442), determining (408) whether the packet count (422) exceeds the packet count threshold (424), resetting (412) the statistics (412), incrementing (414) the throttle rate, and restarting (416) the timer (434), all of which operate in a similar manner as described above.

The method of FIG. 6, however, also includes, for each data communications packet (442) received by the network host (440), incrementing (502) a pre-throttling packet count (508) during a predefined period of time and determining (504) whether the pre-throttling packet count (508) exceeds a pre-throttling threshold (510) during the predefined period of time. A pre-throttling packet count (508) is the number of packets (442) received by the network host (440) before the throttle module (418) initializes (402) the throttling parameters (432) and starts (404) the timer (434), that is, before the throttle module (418) begins throttling incoming data communications packets (442). A pre-throttling threshold (510) is the maximum number of packets that a network host receives during the predefined period of time before the throttle module (418) begins throttling incoming data communications packets. The predefined period of time is typically set by system administrator through, for example, an intrusion detection policy.

The throttle module (418) determines (504) whether the pre-throttling packet count (508) exceeds a pre-throttling threshold (510) by comparing the pre-throttling packet count to the pre-throttling threshold. If the pre-throttling packet count (508) does not exceed the pre-throttling threshold (504) the throttle module (418) waits (506) for the network host (440) to receive the next packet (442). Alternatively, if the pre-throttling packet count (508) exceeds the pre-throttling threshold (504) the throttle module initializes (402), as throttling parameters (432), a predefined time interval (420), a packet count (422), a packet count threshold (424), a throttle rate (426), a keepers count (428), and a discards count (430). The actions taken by the throttle module (418), in dependence upon the determination (504) whether the pre-throttling packet count (508) exceeds a pre-throttling threshold (510) during the predefined period of time, are shown below in the form of C-like pseudocode:

```
StartThrottle (PacketReceived){
        PreThrottlePacketCount = PreThrottlePacketCount ++;
        if(PreThrottlePacketCount > PreThrottleThreshold){
                Throttle( );
        }
        else{
                Wait( );
        }
}
```

As can be seen from this pseudocode when the network host receives a data communications packet, the network sends the StartThrottle function a 'PacketReceived' parameter to determine whether the throttle module will begin throttling data communications packets. The StartThrottle function includes a determination of whether the pre-throttle packet count, 'PreThrottlePacketCount,' has exceeded the pre-throttle threshold, 'PreThrottleThreshold.' If the pre-throttle packet count has exceeded pre-throttle threshold, the throttle module (418) begins throttling by calling the Throttle function. If the pre-throttle packet count has not exceeded the pre-throttle threshold, the throttle module (418) waits for the network host to receive the next data communication packet. That is, the throttle module (418) does not initialize (402) the throttling parameters (432) and begin throttling incoming data packets (442) until the pre-throttling packet count (508) exceeds the pre-throttling threshold (510) during the pre-defined period of time.

Figure 7:
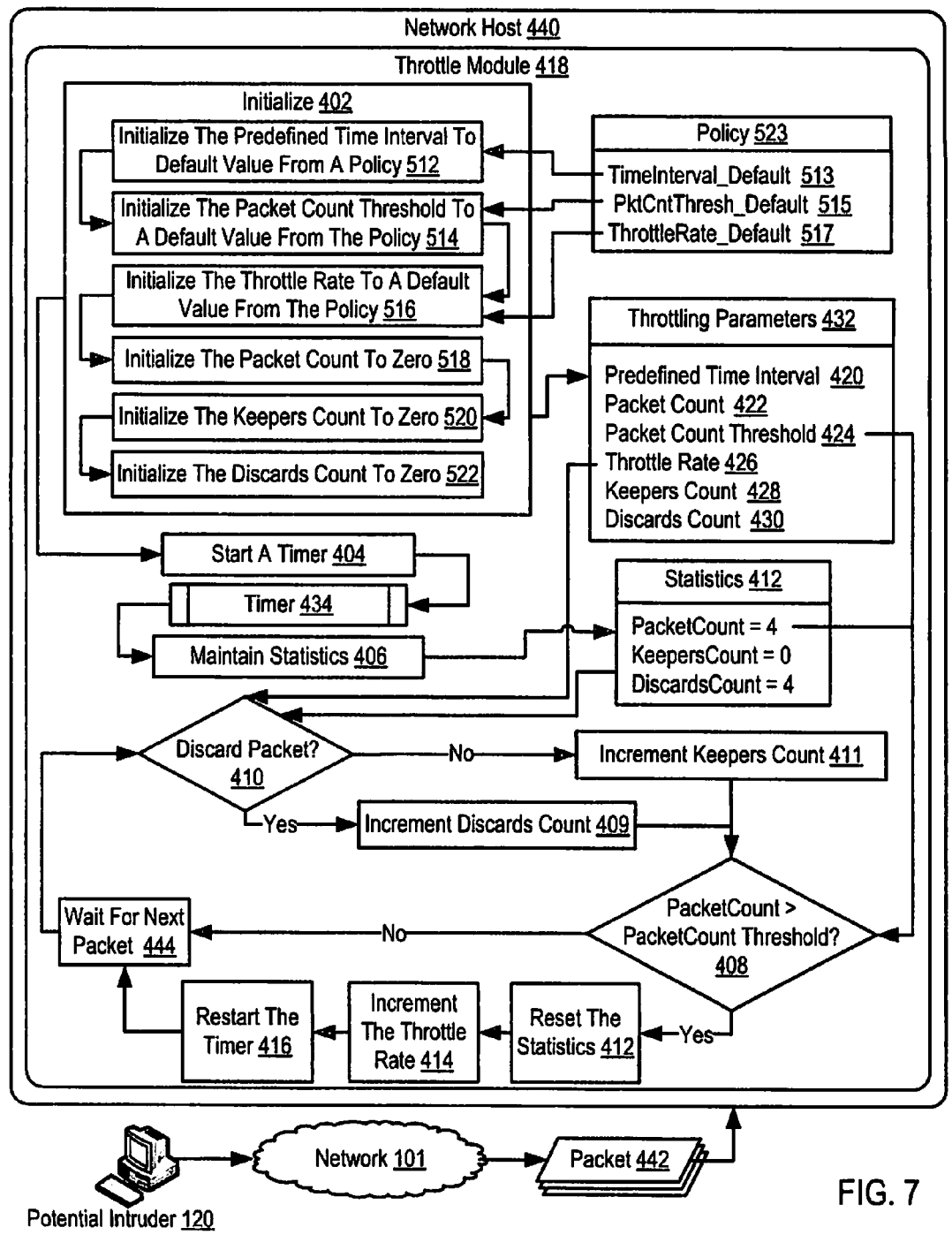
FIG. 7 sets forth a flow chart illustrating a further exemplary method for variable dynamic throttling of network traffic for intrusion prevention according to embodiments of the present invention.

For further explanation, FIG. 7 sets forth a flow chart illustrating a further exemplary method for variable dynamic throttling of network traffic for intrusion prevention according to embodiments of the present invention. The method of FIG. 7 is similar to the method of FIG. 4, including as it does the throttle module's initializing (402) the throttling parameters (432), starting (404) a timer (434), maintaining (406) statistics (412), determining (410) whether to discard the packet (442), determining (408) whether the packet count (422) exceeds the packet count threshold (424), resetting (412) the statistics (412), incrementing (414) the throttle rate, and restarting (416) the timer (434), all of which operate in a similar manner as described above.

In the method of FIG. 7, however, initializing (402) the throttling parameters (432) is carried out by initializing (512) the predefined time interval (420) to default value (513) from a policy (523), initializing (514) the packet count threshold (424) to a default value (515) from the policy (523), initializing (516) the throttle rate (426) to a default value (517) from the policy (523), initializing (518) the packet count (422) to zero, initializing (520) the keepers count (428) to zero, and initializing the discards count (430) to zero. A policy is a definition of secure data communications of a network host that includes default values used by a throttle module for variable dynamic throttling of network traffic for intrusion prevention in accordance with embodiments of the present invention. The exemplary policy (523) of FIG. 7 includes three elements, TimeInterval_Default (513), a default value for a predefined interval of time (420), PckCntThresh_Default (515), a default value for the packet count threshold (424), and ThrottleRate_Default (517), a default value for the throttle rate (426). Initializing (402) the throttling parameters (432) is shown below in a C-form pseudocode:

```
Initialize( ){
        PredefinedTimeInterval =
          PredefinedTimeInterval.IntrusionPolicy;
        PacketCountThreshold = PacketCountThreshold.IntrusionPolicy;
        ThrottleRate = ThrottleRate.IntrusionPolicy;
        PacketCount = 0;
        KeepersCount = 0;
        DiscardsCount = 0;
}
```

As can be seen from this pseudocode, the throttle module initializes the predefined timer interval, 'PredefinedTimeInterval,' the packet count threshold, 'PacketCountThreshold,' and throttle rate, 'ThrottleRate,' to default values from a policy named IntrusionPolicy. The packet count, keepers count, and discards count are set to 0.

Figure 8:
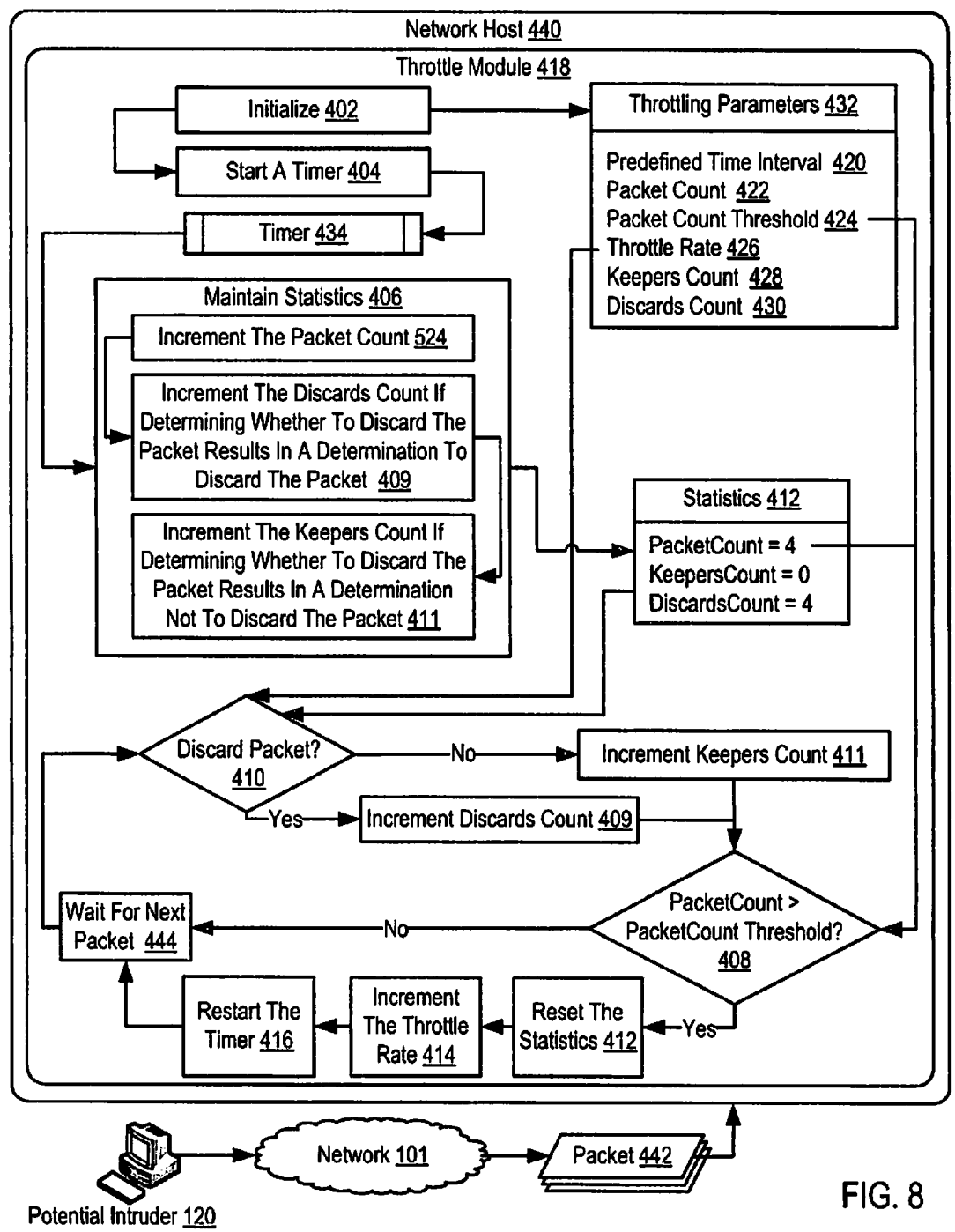
FIG. 8 sets forth a flow chart illustrating a further exemplary method for variable dynamic throttling of network traffic for intrusion prevention according to embodiments of the present invention.

For further explanation, FIG. 8 sets forth a flow chart illustrating a further exemplary method for variable dynamic throttling of network traffic for intrusion prevention according to embodiments of the present invention. The method of FIG. 8 is similar to the method of FIG. 4, including as it does the throttle module's initializing (402) the throttling parameters (432), starting (404) a timer (434), maintaining (406) statistics (412), determining (410) whether to discard the packet (442), determining (408) whether the packet count (422) exceeds the packet count threshold (424), resetting (412) the statistics (412), incrementing (414) the throttle rate, and restarting (416) the timer (434), all of which operate in a similar manner as described above. In the method of FIG. 8, however, maintaining (406) statistics (412) is carried out by incrementing (524) the packet count (422), when the packet (442) is received by the network host (440), incrementing (524) the discards count (430) if determining (410) whether to discard the packet (442) results in a determination to discard the packet, and incrementing (528) the keepers count (428) if determining (410) whether to discard the packet (442) results in a determination not to discard the packet. That is, for each data communications packet (442) received by the network host (440) the throttle module (418) increases, by one, the packet count (422). For each packet that is not discarded during the timer, the throttle module (418) increases, by one, the keepers count (428). And for each data communications packet (442) received by the network host (440) that is discarded, the throttle module (418) increases, by one, the discards count (430).

Figure 9:
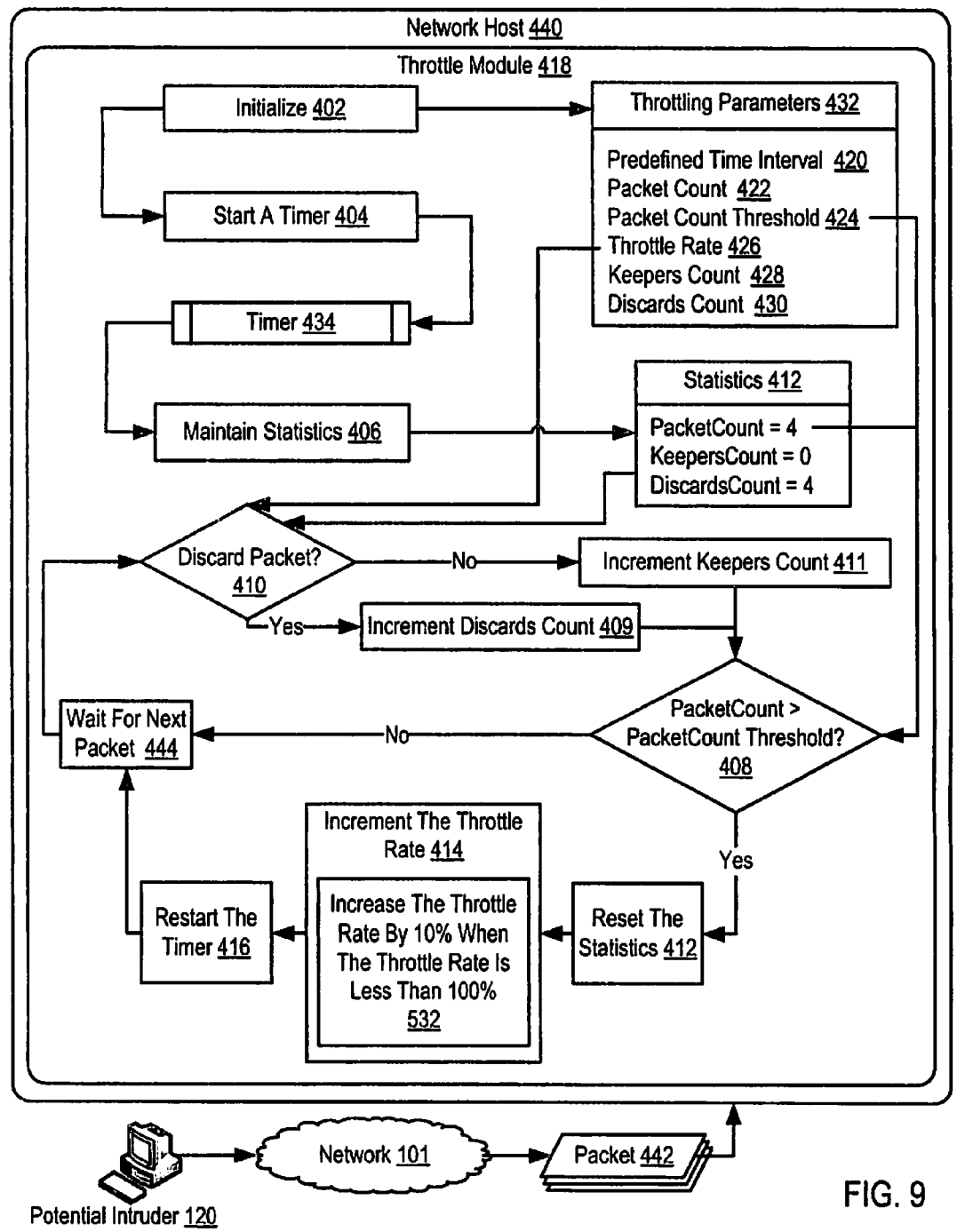
FIG. 9 sets forth a flow chart illustrating a further exemplary method for variable dynamic throttling of network traffic for intrusion prevention according to embodiments of the present invention.

For further explanation, FIG. 9 sets forth a flow chart illustrating a further exemplary method for variable dynamic throttling of network traffic for intrusion prevention according to embodiments of the present invention. The method of FIG. 9 is similar to the method of FIG. 4, including as it does the throttle module's initializing (402) the throttling parameters (432), starting (404) a timer (434), maintaining (406) statistics (412), determining (410) whether to discard the packet (442), determining (408) whether the packet count (422) exceeds the packet count threshold (424), resetting (412) the statistics (412), incrementing (414) the throttle rate, and restarting (416) the timer (434), all of which operate in a similar manner as described above. In the method of FIG. 9, however, incrementing (414) the throttle rate (426) is carried out by increasing (532) the throttle rate (426) by 10% when the throttle rate (426) is less than 100%. Incrementing the throttle rate is shown below in C-form pseudocode:

```
IncrementThrottle(ThrottleRate){
    if(ThrottleRate < 100%){
        ThrottleRate = ThrottleRate + 10%;
    }
    else{
        ThrottleRate = 100%;
    }
}
```

As can be seen from this pseudocode the throttle rate (426), 'ThrottleRate,' is increased by 10% up to a maximum value of 100%. When the throttle rate (426) is 100% every packet received by the network host is discarded. As suspicious behavior increases over time, or does not change after throttling begins, the throttling rate is increased until every packet received from the potential intruder is discarded. In view of the explanations set forth above, readers will recognize that the benefits of variable dynamic throttling of network traffic for intrusion prevention according to embodiments of the present invention include:

Variable dynamic throttling is engaged and disengaged dynamically, without operator intervention;

Variable dynamic throttling rewards good network behavior by disengaging the throttling rate when the behavior has changed and punishes suspicious network behavior by increasing the throttling rate until good network behavior is achieved;

Variable dynamic throttling provides system administrators the opportunity to investigate suspicious network traffic by allowing keeping some packets if the threshold rate is under 100%;

Variable dynamic throttling typically does not completely deny access to a potential intruder that is not actually an intruder; and Others benefits as will occur to readers of skill in the art.

Exemplary embodiments of the present invention are described largely in the context of a fully functional computer system for variable dynamic throttling of network traffic for intrusion prevention. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of variable dynamic throttling of network traffic in a network for intrusion prevention, the method implemented by a throttle module in a network host, the network host comprising a computer that receives data communications packets from the network, the method comprising:

initializing, as throttling parameters, a predefined time interval, a packet count, a packet count threshold, a throttle rate, a keepers count, and a discards count;

starting a timer, the timer remaining on no longer than the predefined time interval;

maintaining, while the timer is on, statistics including the packet count, the keepers count, and the discards count;

for each data communications packet received by the network host, determining, in dependence upon the statistics and the throttle rate, whether to discard the packet and determining whether the packet count exceeds the packet count threshold; and if the packet count exceeds the packet count threshold: resetting the statistics, incrementing the throttle rate, and restarting the timer.

2. The method of claim 1 further comprising:

for each data communications packet received by the network host, incrementing a pre-throttling packet count during a predefined period of time and determining whether the pre-throttling packet count exceeds a pre-throttling threshold during the predefined period of time;

wherein initializing, as throttling parameters, a predefined time interval, a packet count, a packet count threshold, a throttle rate, a keepers count, and a discards count further comprises initializing the throttling parameters if the pre-throttling packet count exceeds the pre-throttling threshold.

3. The method of claim 1 wherein initializing, as throttling parameters, a predefined time interval, a packet count, a packet count threshold, a throttle rate, a keepers count, and a discards count further comprises:

initializing the predefined time interval to a default value from a policy;

initializing the packet count threshold to a default value from the policy;

initializing the throttle rate to a default value from the policy;

initializing the packet count to zero;

initializing the keepers count to zero; and initializing the discards count to zero.

4. The method of claim 1 wherein maintaining statistics further comprises:

incrementing the packet count;

incrementing the discards count if determining whether to discard the packet results in a determination to discard the packet; and incrementing the keepers count if determining whether to discard the packet results in a determination not to discard the packet.

5. The method of claim 1 wherein incrementing the throttle rate further comprises increasing the throttle rate by 10% when the throttle rate is less than 100%.

6. The method of claim 1 wherein determining whether to discard the packet further comprises:
- expressing the throttle rate as an irreducible fraction having a numerator and a denominator; and
- if the discards count is less than the numerator, discarding the packet and incrementing the discards count; and
- if the discards count is equal to the numerator, keeping the packet and incrementing the keepers count.

7. A computer program product for variable dynamic throttling of network traffic for intrusion prevention, the computer program product disposed in a recordable storage medium, the computer program product comprising computer program instructions implemented by a throttle module in a network host, the network host comprising a computer that receives data communications packets from the network, the computer executing the computer program instructions to perform the steps of:
- initializing, as throttling parameters, a predefined time interval, a packet count, a packet count threshold, a throttle rate, a keepers count, and a discards count;
- starting a timer, the timer remaining on no longer than the predefined time interval;
- maintaining, while the timer is on, statistics including the packet count, the keepers count, and the discards count;
- for each data communications packet received by the network host, determining, in dependence upon the statistics and the throttle rate, whether to discard the packet and determining whether the packet count exceeds the packet count threshold; and
- if the packet count exceeds the packet count threshold: resetting the statistics,
- incrementing the throttle rate, and restarting the timer.

8. The computer program product of claim 7 further comprising:
- for each data communications packet received by the network host, incrementing a pre-throttling packet count during a predefined period of time and computer program instructions capable of determining whether the pre-throttling packet count exceeds a pre-throttling threshold during the predefined period of time;
- wherein initializing, as throttling parameters, a predefined time interval, a packet count, a packet count threshold, a throttle rate, a keepers count, and a discards count further comprises initializing the throttling parameters if the pre-throttling packet count exceeds the pre-throttling threshold.

9. The computer program product of claim 7 wherein initializing, as throttling parameters, a predefined time interval, a packet count, a packet count threshold, a throttle rate, a keepers count, and a discards count further comprises:
- initializing the predefined time interval to a default value from a policy;
- initializing the packet count threshold to a default value from the policy;
- initializing the throttle rate to a default value from the policy;
- initializing the packet count to zero;
- initializing the keepers count to zero; and
- initializing the discards count to zero.

10. The computer program product of claim 7 wherein maintaining statistics further comprises:
- incrementing the packet count;
- incrementing the discards count if determining whether to discard the packet results in a determination to discard the packet; and
- incrementing the keepers count if determining whether to discard the packet results in a determination not to discard the packet.

11. The computer program product of claim 7 wherein incrementing the throttle rate further comprises increasing the throttle rate by 10% when the throttle rate is less than 100%.

12. The computer program product of claim 7 determining whether to discard the packet further comprises:
- expressing the throttle rate as an irreducible fraction having a numerator and a denominator; and
- if the discards count is less than the numerator, discarding the packet and incrementing the discards count; and
- if the discards count is equal to the numerator, keeping the packet and incrementing the keepers count.

* * * * *